United States Patent [19]

Masuhara et al.

[11] Patent Number: 4,663,116
[45] Date of Patent: May 5, 1987

[54] NUCLEAR REACTOR

[75] Inventors: Yasuhiro Masuhara, Hitachi; Motoaki Utamura, Kitaibaraki; Shinichi Kashiwai, Hitachi; Iwao Yokoyama, Kitaibaraki; Shigeto Murata; Toshitsugu Nakao, both of Hitachi; Yuichiro Maeda, Nagasaki, all of Japan

[73] Assignee: Hitachi, Ltd., Tokyo, Japan

[21] Appl. No.: 528,740

[22] Filed: Sep. 1, 1983

[30] Foreign Application Priority Data

Sep. 7, 1982 [JP] Japan ................... 57-155666

[51] Int. Cl.⁴ .............................. G21C 9/00
[52] U.S. Cl. .................... 376/377; 376/292; 376/370; 376/372
[58] Field of Search ............. 376/272, 283, 291, 292, 376/370, 372, 373, 377, 379, 402, 403

[56] References Cited

U.S. PATENT DOCUMENTS

| | | | |
|---|---|---|---|
| 3,042,595 | 7/1962 | Cobb et al. | 376/379 |
| 3,167,480 | 1/1965 | West et al. | 376/373 |
| 3,180,803 | 4/1965 | Gibbons | 376/377 |
| 3,264,189 | 8/1966 | Regimbal | 376/403 |
| 3,400,047 | 9/1968 | Howard | 376/372 |
| 3,625,820 | 12/1971 | Gluntz et al. | 376/372 |
| 3,807,599 | 4/1974 | Schettler et al. | 376/272 |
| 4,022,655 | 5/1977 | Gaouditz et al. | 376/283 |
| 4,236,969 | 12/1980 | Ljubivy et al. | 376/272 |
| 4,400,343 | 8/1983 | Izumi et al. | 376/379 |

FOREIGN PATENT DOCUMENTS 155391 12/1979 Japan ................... 376/372

OTHER PUBLICATIONS

*Nuclear Energy Technology*, McGraw Hill, 1981, Knief, pp. 304–306.

Primary Examiner—Charles T. Jordan
Assistant Examiner—Richard Klein
Attorney, Agent, or Firm—Antonelli, Terry & Wands

[57] ABSTRACT

A nuclear reactor is equipped with a cooling water circulation system which includes a water-feed conduit and a drain conduit to circulate the cooling water to and from a pressure vessel which surrounds a reactor core, the cooling water having a free liquid level maintained above the reactor core. The drain conduit is inserted in the pressure vessel from the upper side toward the lower side relative to the free liquid level. A double tube consisting of an inner tube and an outer tube maintaining a gap therebetween is formed in the end portion of the drain conduit. The inner tube and outer tube being continuous with the drain conduit, the opening at the lower end of the inner tube is located below said free liquid level but above the reactor core. The opening at the upper end of the outer tube is located above the free liquid level. The opening at the lower end of said outer tube is located below the reactor core.

9 Claims, 15 Drawing Figures

NUCLEAR REACTOR

BACKGROUND OF THE INVENTION

1. Field of the Invention

The present invention relates to a nuclear reactor of the type in which the cooling water has a free liquid level in the pressure vessel such as in the boiling-water reactor, so that even when a break has developed in the drain conduit in a system which circulates the cooling water into the pressure vessel in the reactor, the cooling water is prevented from escaping, and the cooling water is allowed to remain in sufficiently large amounts in the pressure vessel.

2. Description of the Prior Art

A conventional boiling-water reactor is equipped, with a cooling water recirculation system which consists of recirculation conduits recirculation pumps, and jet pumps, in order to supply large amounts of cooling water to a reactor core to enhance the core efficiency. From the necessity to take out the cooling water of a relatively low temperature from the pressure vessel of the reactor, an intake of the drain conduit in the cooling water recirculation system is opened in the pressure vessel at a position below the reactor core. In such a nuclear reactor, if breakage develops in the drain conduit, the cooling water gushes out through a broken portion since the pressure is high in the pressure vessel, the water level in the pressure vessel drops quickly to the position of intake of the conduit, and the reactor core burns without the cooling water.

Another nuclear reactor in which the cooling water has a free liquid level in the pressure vessel of nuclear reactor can be represented by a nuclear reactor of the type of natural circulation. In the nuclear reactor of this type, provision is usually made of a purifying system or a spray system for pressure control between the interior and the exterior of the pressure vessel to circulate the cooling water while purifying the cooling water or controlling the pressure in the pressure chamber. In the former system, the intake of the drain conduit is opened in the lower portion of the pressure vessel so that precipitates deposited on the lower portion of the pressure vessel can be removed. In the latter system, also, the intake of the drain conduit is opened in the lower portion of the pressure vessel so that cold cooling water can be taken out. Even in such a nuclear reactor, if the drain conduit breaks, the water level in the pressure vessel may drop to the level of intake of the drain conduit, and the reactor core may burn without the cooling water.

SUMMARY OF THE INVENTION

The object of the present invention therefore is to provide a nuclear reactor equipped with a cooling water circulation system which circulates the cooling water to and from a pressure vessel which surrounds a reactor core, maintaining a free liquid level of cooling water above the reactor core, wherein even when the conduit is broken, the level of cooling water in the pressure vessel does not drop to the position of an intake even though the intake of the drain conduit in the cooling water circulation system is located below the reactor core, and the cooling water remains in the pressure vessel in amounts sufficient to avoid such an occurrence that the reactor core burns without the cooling water.

To accomplish the above-mentioned object according to the present invention there is provided a nuclear reactor equipped with a cooling water circulation system which includes a water-feed conduit and a drain conduit to circulate the cooling water to and from a pressure vessel which surrounds a reactor core, the cooling water having a free liquid level maintained above the reactor core, the improvement wherein said drain conduit is inserted in the pressure vessel from the upper side toward the lower side relative to said free liquid level, a double tube consisting of an inner tube and an outer tube maintaining a gap therebetween is formed in the end portion of said drain conduit, said inner tube and outer tube being contiguous with said drain conduit, the opening at the lower end of the inner tube is located below said free liquid level but above said reactor core, the opening at the upper end of said outer tube is located above said free liquid level, and the opening at the lower end of said outer tube is located below the reactor core.

According to the present invention, there is provided a nuclear reactor equipped with a cooling water circulation system which includes a water-feed conduit and a drain conduit to circulate the cooling water to and from a pressure vessel which surrounds a reactor core, the cooling water having a free liquid level maintained above the reactor core, the improvement wherein said drain conduit is inserted in the pressure vessel from the upper side toward the lower side relative to said free liquid level, the opening at the lower end of said drain conduit is located below the reactor core, and a lateral hole is formed in said drain conduit at a position lower than said free liquid level but higher than the reactor core.

DESCRIPTION OF THE PREFERRED EMBODIMENT

Figure 1:
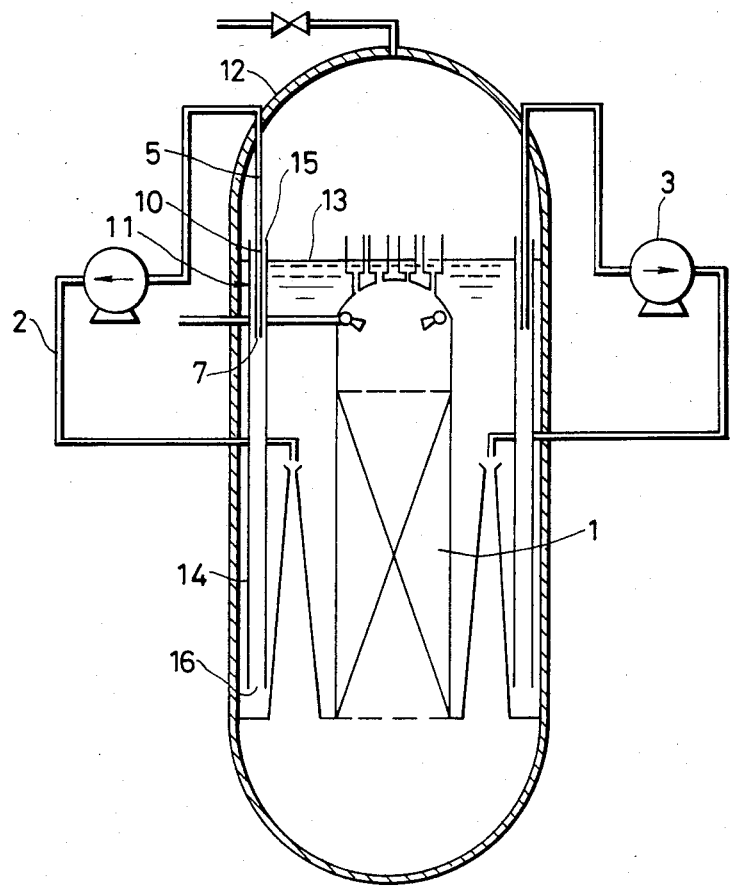
FIG. 1 is a sectional view which schematically shows one embodiment of the present invention.

FIG. 1 shows an embodiment of the invention which is constructed based upon the conventional boiling-water reactor. The feature of this embodiment resides in that a drain conduit 5 of a recirculation system 2 has an inner tube 10 formed at an end portion thereof, a long outer tube 14 is disposed to surround the inner tube 10 maintaining a gap therebetween thereby forming a double tube 11, the double tube being inserted in the pressure vessel 12 from the upper direction, an opening 7 at the end of the inner tube 10 is located slightly below the level 13 of cooling water in the pressure vessel but at an upper position of the reactor core 1, an opening 15 at the upper end of the outer tube 14 is located above the water level 13, and an opening 16 at the lower end of the outer tube 14 is located at a lower position of the pressure vessel 12. With this construction, in case the drain conduit 5 in the recirculation system 2 is broken, the final water level in the pressure vessel 12 remains at a position of opening 7 at the end of the inner tube 10 and drops no more. Operation of the drain conduit 5 equipped with the double tube 11 will be described below with reference to FIGS. 2 and 4.

Figure 2:
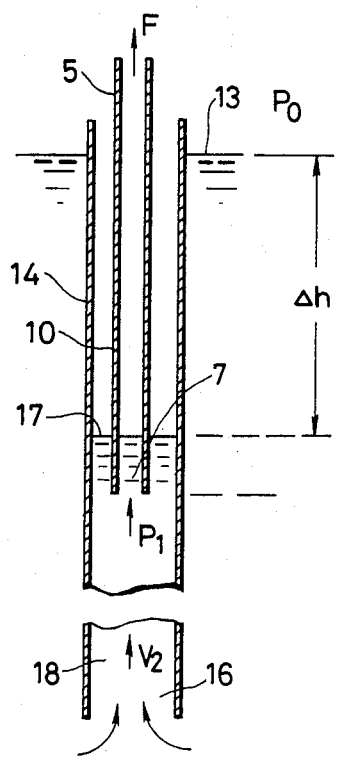
FIG. 2 is a diagram which schematically illustrates the operation of a double tube in the embodiment.
Figure 3:
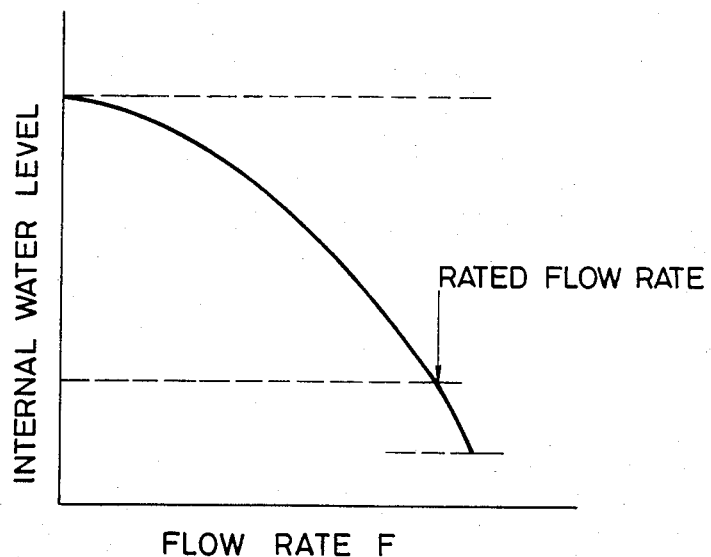
FIG. 3 is a graph showing a relation between the internal water level and the flow rate of water which flows through the inner tube of double tube.

FIG. 2 is a diagram which schematically illustrates the operation of the drain conduit 5 in the recirculation system equipped with the double tube 11, and FIG. 3 illustrates a relation between a flow rate F of drain water which flows through the drain conduit 5 and an internal water level 17 surrounded by the outer tube 14 and the inner tube 10. Under ordinary operation condition, the velocity of flow $V_2$ of the cooling water flowing through the outer tube 14 increases with the increase in the flow rate F of drain water, and the pressure loss between the lower end 16 of the outer tube and the end 7 of the inner tube increases in proportion to the square power of the velocity of flow $V_2$. Consequently, the pressure $P_1$ decreases at the end 7 of the inner tube, and the internal water level 17 drops between the inner tube 10 and the outer tube 14. It is, however, possible to so design the system that the internal water level 17 is maintained above the end 7 of the inner tube under steady-state operation condition as indicated as a rated flow rate in FIG. 3. Therefore, the cooling water of a low temperature in the lower portion of the pressure vessel 12 can be taken in through the exhaust tube 5 from the lower end 16 of outer tube 14.

If the drain conduit 5 in the recirculation system breaks outside the pressure vessel, the cooling water gushes abruptly through the broken portion due to high pressure in the pressure vessel. In such an event, the flow rate F of water through the drain conduit 5 increases strikingly, the pressure loss increases at the inlet port 18 of the tube, and the internal water level 17 drops according to a curve of FIG. 4. As the internal water level 17 becomes lower than the opening 7 at the end of the inner tube, water vapor above the water level 13 is sucked by the inner tube 10. Therefore, flow rate F of the cooling water reduces drastically, and the pressure reduces in the pressure vessel. The phenomenon of flow in the double tube 11 will be described below in detail in conjunction with FIGS. 4 and 5.

Figure 4:
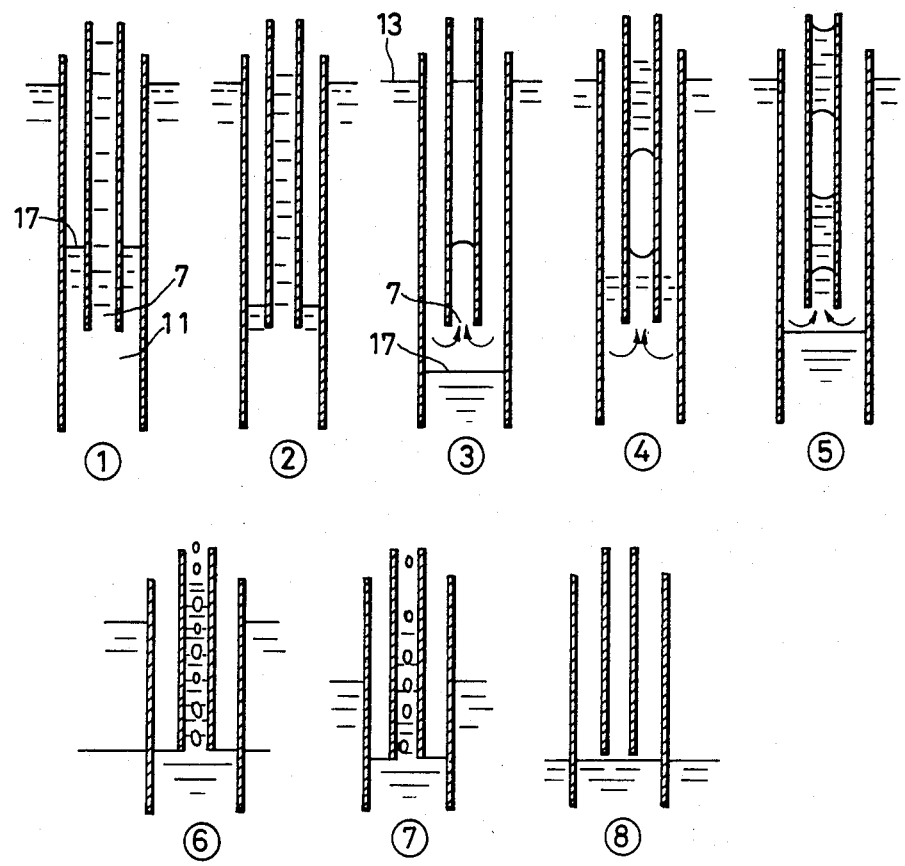
FIG. 4 is a diagram illustrating the operation of the double tube.
Figure 5:
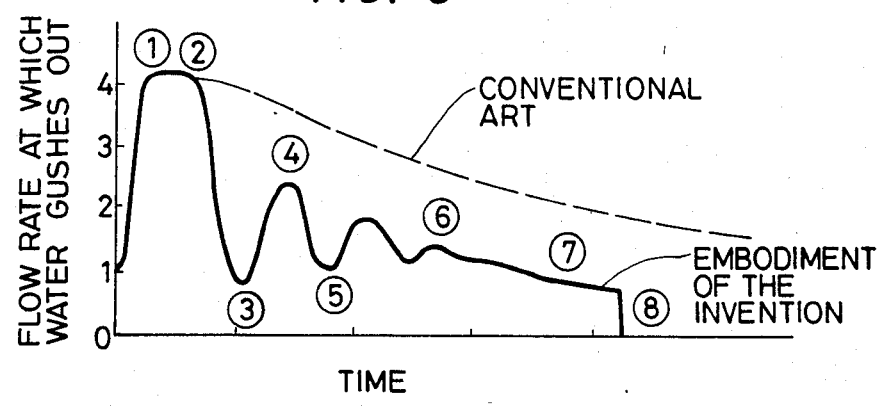
FIG. 5 is a diagram which illustrates the change of flow rate of water through the double tube in case the drain conduit is broken, with the lapse of time.
Figure 7:
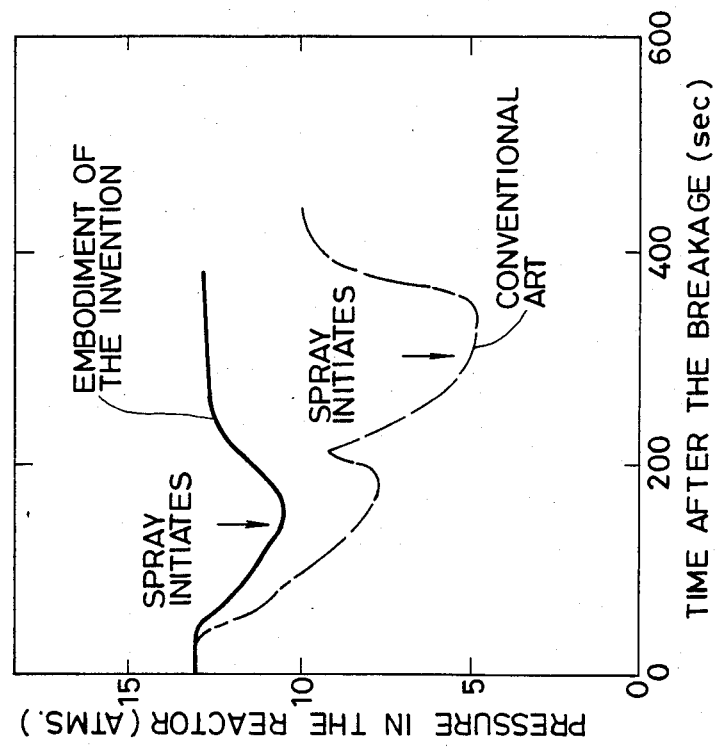
FIG. 7 is a diagram which also compares changes of water level in the reactor.

Diagrams (1) to (8) of FIG. 4 illustrate the flow in the double tube 11 with the lapse of time after the drain conduit is broken, and FIG. 5 illustrates the flow rate of water through the drain conduit as a function of time. if the drain conduit 5 breaks, the flow rate of water through the broken portion increases abruptly as mentioned above, and the pressure decreases at the end portion 7 of the inner tube. Therefore, the internal water level 17 of the diagram (1) drops and reaches the end portion 7 of the inner tube (diagram (2)). The internal water level 17, however, continues to further drop due to the inertial force of water head in the double tube. Therefore, the water vapor above the water level 13 flows into the inner tube as shown in the diagram (3) of FIG. 5, and the water in the vessel does not flow into the inner tube. The pressure therefore increases at the end 7 of the inner tube, and the internal water level 17 rises again and reaches the end portion 7 of the inner tube. The internal water level 17, however, continues to further rise due to the inertial force, and the water flows out again through the inner tube (diagram (4)). As the water flows out again, the pressure decreases at the end portion 7 of the inner tube because of the reasons mentioned above, and the internal water level 17 drops (diagram (5)). Thus, the internal water level 17 vibrates like in a U-tube and finally settles at a position of end portion 7 of the inner tube (diagrams (6) and (7)). In this case, vapor and water are sucked simultaneously and, hence, the flow rate becomes small compared with the conventional art as shown in FIG. 7. The reasons are as mentioned below. Because of the difference of density between water and water vapor, the flow rate which the water gushes out of the system is determined by the flow rate of water. The flow rate at which the water flows out assumes such a value that a pressure loss, which corresponds to the difference in position between the water level 13 in the vessel and the internal water level 17, generates in a flow path between the inlet port 16 of the double tube and the end portion 7 of the inner tube. According to the embodiment of the present invention, therefore, the flow rate at which the water flows out is restrained compared with the conventional art according to which the flow rate at which the water flows out is determined by the absolute pressure in the pressure vessel 12. As shown in the diagram (8) of FIG. 4, furthermore, the cooling water flows out no more when the water level 13 in the vessel drops to the position of end portion 7 of the inner tube. Therefore, the water level finally settles at the position of end portion 7 of the inner tube 10. In other words, the cooling water flows out in small amounts compared with the conventional art.

Figure 6:
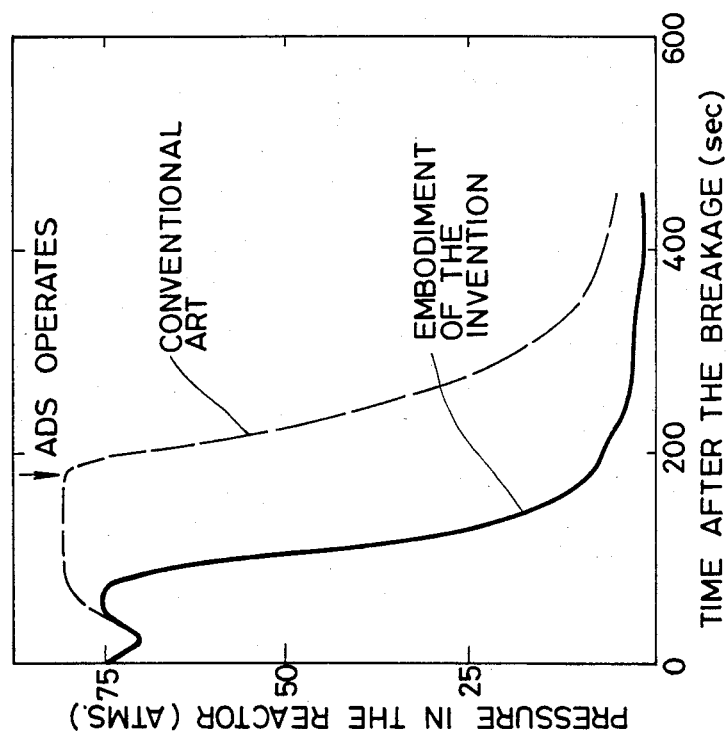
FIG. 6 is a diagram comparing the change of pressure in the reactor between the the embodiment of the present invention employing double tube and the conventional art.

The embodiment of the invention and the conventional art are compared below concerning the change of pressure in the pressure vessel and the water level of cooling water in the pressure vessel, i.e., water level in the reactor, with the lapse of time. FIG. 6 illustrates the change of pressure in the reactor (pressure in the pressure vessel) after the conduit is broken, and FIG. 7 illustrates the change of water level in the reactor. Immediately after the breakage, pressure in the pressure vessel changes in the same manner even in the embodiment of the present invention or in the conventional art. Difference, however, develops between the two after some periods of time have passed. This difference stems from the fact that in the embodiment of the present invention, vapor is sucked as shown in FIG. 5. Thereafter, the pressure in the reactor decreases abruptly in the embodiment of the present invention. This is because the water level 13 in the reactor drops lower than the end portion 7 of the inner tube 10 of double tube, and the water vapor is released suddenly. According to the embodiment of the invention, therefore, the pressure in the vessel decreases at an early time compared with the conventional art. Therefore, water boils under reduced pressure to promote the effect for cooling the reactor core. Further, it becomes possible to operate the system for inserting an emergency reactor core at an early time, as well as to replenish the water in the nuclear reactor at an early time. Moreover, since water flows out in small amounts, the emergency system for cooling the reactor core needs bear a reduced burden, and the cost for installation can be reduced. Compared with the conventional art as will be obvious from FIG. 7, furthermore, the cooling water according to the embodiment of the present invention is left in the reactor in amounts sufficient to surround the reactor core at all times, making it possible to cool the reactor core by way of natural circulation. Further, since the reactor core is cooled as mentioned above, the emergency system for cooling the reactor core needs bear a reduced burden as mentioned above, and the cost for facility can be reduced.

Figure 8:
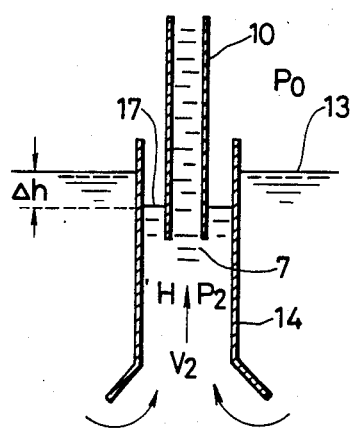
FIGS. 8 to 10 are schematic section views illustrating the first invention having double tubes of different shapes according to further embodiments.

FIG. 8 shows another embodiment of the invention. According to this embodiment, the lower end of outer tube of double tube assumes the shape of a funnel flaring downwardly, and making a difference from the above-mentioned embodiment in which the lower end of the outer tube is straight. In FIG. 2, the difference $\Delta h$ in height between the water level 13 in the reactor and the internal water level 17, is determined by a pressure $P_0$ in the pressure vessel acting on the water surface and a pressure $P_2$ in the tube, i.e., given by a relation, $$\Delta h = P_0 - P_2 \quad (1)$$

The pressure $P_2$ in the tube is determined by the total water head H in the outer tube, velocity of flow $V_2$, and density $\rho$ of water, i.e., expressed as, $$H = P_2 + \tfrac{1}{2}\rho V_2^2 \quad (2)$$

Loss of water head caused by the shape of the lower portion of the outer tube is expressed as, $$h_e = \zeta V_2^2 / 2g \quad (3)$$

where g denotes a gravitational acceleration and $\zeta$ denotes a loss coefficient. When the end of the outer tube has a straight tubular, $\zeta$ is 0.5. When the end of the outer tube has the shape of a funnel, $\zeta$ is 0.05. The total water head H of the equation (2) is reduced by an amount corresponding to the loss of water head of the equation (3). In the embodiment of FIG. 8, therefore, the total water head H becomes larger than that of the embodiment shown in FIGS. 2 and 3, and hence the pressure $P_0$ in the pressure vessel increases according to the equation (2). From the equation (1), therefore, the difference $\Delta h$ in height becomes small. That is, the embodiment of FIG. 8 makes it possible to make the position of opening 7 at the end of the inner tube shallow compared with the embodiment of FIGS. 1 and 2 and, accordingly, to increase the amount of water remaining in the reactor.

Figure 9:
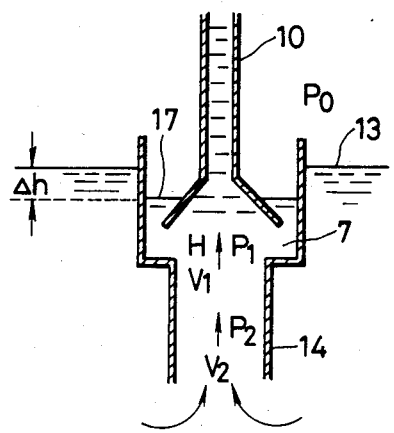

FIG. 9 illustrates a further embodiment of the first invention. According to this embodiment, the outer tube has an increased diameter in the upper portion, and the inner tube has the shape of a funnel in the lower portion flaring downwardly. Therefore, the flow path widens, and the velocity of flow $V_1$ becomes smaller than $V_2$. The total water head H and the density $\rho$ remain the same. From the equation (2), therefore, $P_2 < P_1$. From the equation (1), therefore, the difference $\Delta h$ in height decreases correspondingly. Even in this embodiment, therefore, it becomes possible to make the position of lower end of inner tube more shallow, and to increase the amount of water which remains in the reactor.

Figure 10:
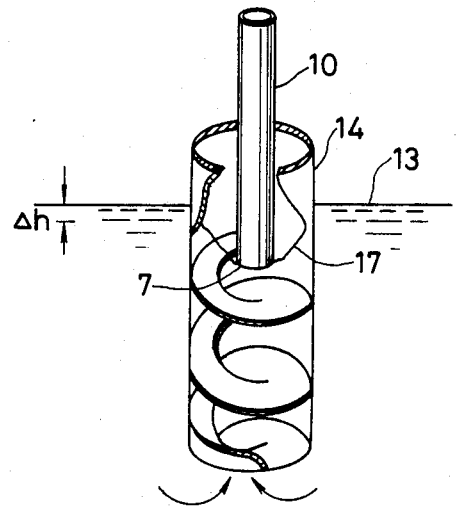

FIG. 10 shows a still further embodiment of the first invention. According to this embodiment, helical fins are provided in the outer tube below the opening 7 at the lower end of the inner tube 10. In the event the conduit is broken, therefore, the cooling water which is quickly sucked into the inner tube flows being rotated due to the presence of the fin. Due to the centrifugal force, therefore, the internal water surface 17 becomes low in the central portion and high toward the circumference of the outer tube. Therefore, the water vapor is sucked in large amounts by the inner tube, and the effect for reducing the pressure is promoted as mentioned in the first embodiment. Further, the opening at the lower end of the inner tube can be located at a position higher than that of the first embodiment, so that the water level remains high even in case the conduit is broken, contributing to increase safety performance of the nuclear reactor.

Figure 11:
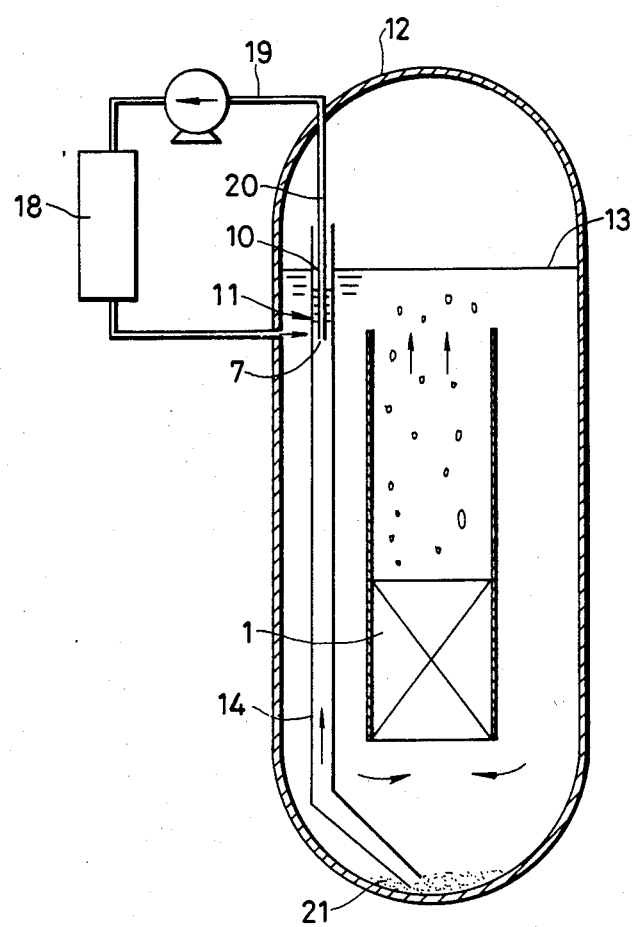
FIGS. 11 and 12 are section views illustrating embodiments of the present invention when the nuclear reactor of the type of natural circulation is adapted to the system for purifying the cooling water and to the spray system for controlling the pressure.

FIG. 11 shows a further embodiment of the first invention. The feature of this embodiment resides in that a double tube 11 consisting of an inner tube 10 which is a portion of conduit 19 and an outer tube 14, is provided at an end portion 20 on the drain side of the conduit in a system 18 for purifying the water of nuclear reactor of the type of natural circulation, and that the opening at the lower end of the double tube is located at a lower position of the pressure vessel 12. In the reactor of the type of natural circulation, precipitates such as sludge accumulates in the bottom portion 21 of the pressure vessel 12. It is therefore necessary to take out the precipitate from the pressure vessel 12 and remove it through the purifying system 18. For this purpose according to the conventional art, the intake at the end of the conduit on the drain side had been formed in the bottom 21 of the pressure vessel. With this construction, however, the water level in the reactor finally drops to the position of the intake in case the conduit 19 in the purifying system 18 is broken, and the reactor core burns without the cooling water. To maintain the safety, therefore, it is indispensable to install an emergency system for cooling the reactor core, requiring increased manufacturing cost. According to the embodiment of the present invention, on the other hand, the final water level in the reactor is maintained at the end portion 7 of inner tube 10 in the double tube 11 in case the conduit is broken. Consequently, the reactor core is not burned in the absence of cooling water, and the emergency system for cooling the reactor core needs bear a reduced burden, making it possible to increase the safety performance of the nuclear reactor.

Figure 12:
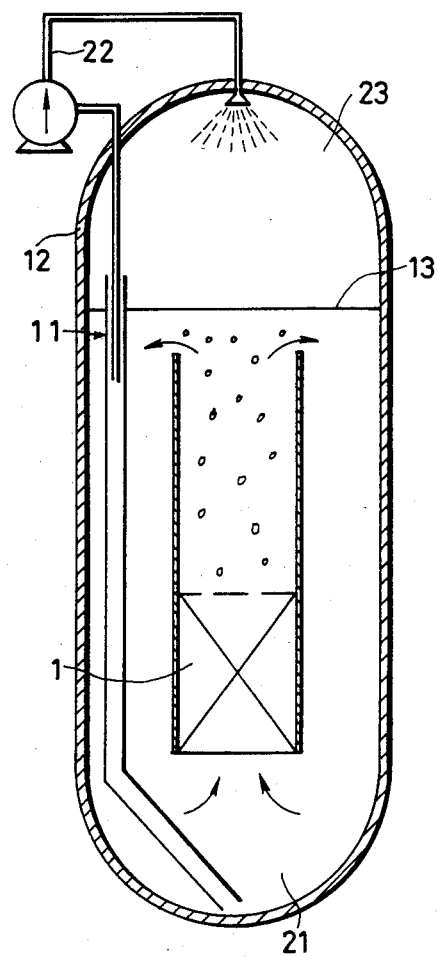

Yet a further embodiment of the invention is shown in FIG. 12. The feature of this embodiment resides in that the same double tube 11 as that of the aforementioned embodiments is provided on the intake side of a conduit 22 in the spray system for controlling pressure in the nuclear reactor of the type of natural circulation, and the opening at the lower end of the double tube 11 is located on the bottom 21 of the pressure vessel 12. In the pressure control spray system, the water vapor which exists in the upper portion 23 of the pressure vessel 12 is condensed by spraying water, thereby to control the pressure. Therefore, the water to be sprayed must be taken from the reactor and must have a low temperature. According to this embodiment, the water of a low temperature in the bottom 21 of the pressure vessel 12 can be sprayed for this purpose. Furthermore, the reactor core can be maintained under safe condition because of the same reasons as the above embodiments.

In the embodiments of FIGS. 11 and 12, use can be made of double tubes of the shapes shown in FIGS. 8 to 10.

Figure 13:
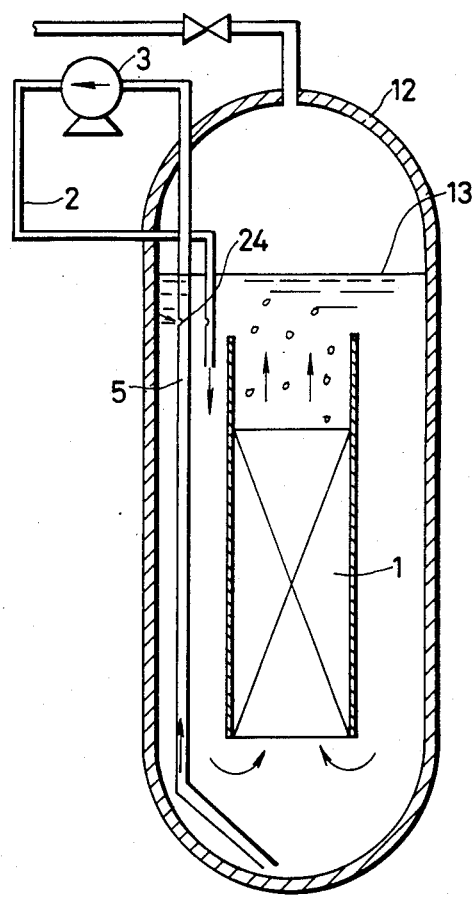
FIG. 13 is a schematic section view of another embodiment of the present invention.

FIG. 13 illustrates another embodiment of the invention. The feature of this embodiment resides in that a drain conduit 5 in the recirculation system 2 of the boiling-water reactor is inserted in the pressure vessel 12 from the upper side, the opening at the end of the drain conduit 5 is located at the lower portion of the pressure vessel 12, and one or more lateral holes 24 for sucking gas are formed in the drain conduit 5 at a position between the water level 13 in the reactor and the upper portion of the reactor core 1. According to this construction, in case the drain conduit 5 in the recirculation system is broken, the final water level in the pressure vessel 12 is maintained at a position of lateral holes 24 for sucking gas formed in the drain conduit 5, and does not drop any more. Operation of the thus constructed drain tube 5 will be described below in conjunction with FIGS. 14 and 15.

Figure 14:
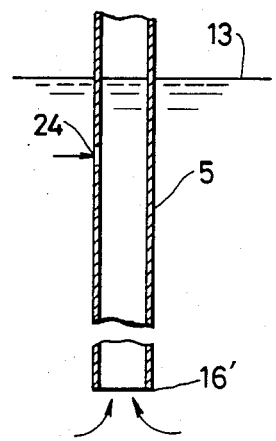
FIGS. 14 and 15 are schematic views illustrating the operation of the drain conduit which has holes for sucking gas in the embodiment of FIG. 13.
Figure 15:
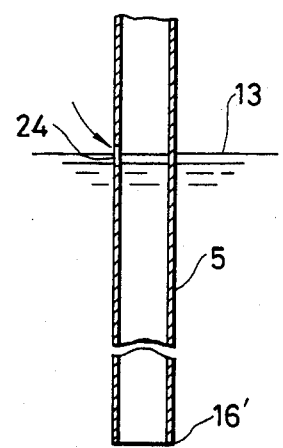

FIG. 14 shows the condition of water level 13 and the drain conduit 5 under steady-state operation condition. The lateral hole 24 for sucking gas is so small that the water flows in small amounts into the conduit 5 under the steady-state operation condition; i.e., most of the water is sucked through an intake port 16' at the lower end of the conduit 5, and the steady-state operation condition is not interrupted. However, in case the drain conduit breaks, the cooling water gushes out of the pressure vessel through a broken portion since the pressure is high in the reactor. Hence, the amount of cooling water decreases in the reactor, and the water level drops in the reactor. However, as the water level 13 in the reactor drops to a position of lateral hole 24 for sucking gas as shown in FIG. 15, the vapor above the water level 13 is sucked into the drain conduit 5 through the hole 24. Further, since the ratio of flow resistance of water to vapor in the hole 24 varies in proportion to the ratio of densities, the flow resistance which the vapor receives when it passes through the hole 24 can be neglected. That is, the vapor is emitted in large amounts from the reactor through the gas-sucking hole 24. Accordingly, the pressure in the reactor (pressure in the pressure vessel) drops, and the emergency system for cooling the reactor core is operated at an early time. Moreover, since the vapor is emitted in large amounts out of the pressure reactor through the gas-sucking lateral hole 24, the water level 13 in the reactor is maintained at a position of the hole 24. Hence, the cooling water remains in the pressure vessel in amounts sufficient for cooling the reactor core, and there is no probability of burning the reactor core without the cooling water. Thus, the emergency system for cooling the reactor core needs bear a reduced burden, and the facility can be constructed requiring reduced cost.

According to the present invention as explained in the foregoing, in case the drain conduit in the cooling water circulation system is broken in the nuclear reactor in which the cooling water has a free liquid level in the pressure vessel, the final water level in the reactor can be maintained at a level of end portion of the inner tube of the double tube or at a level of lateral hole for sucking gas. Further, the water vapor emits at an early time, the cooling water remains in the reactor in amounts sufficient to cool the reactor core, the water which boils under reduced pressure promotes the effect for cooling the reactor core, the pressure which reduces in the reactor at an early time makes it possible to operate the emergency core-cooling system at an early time, the emergency core-cooling system needs bear a reduced burden, and cost for constructing facilities can be reduced. In addition, construction of the nuclear reactor can be very simplified.

What is claimed is:

1. In a nuclear reactor equipped with a cooling water circulation system which includes a water-feed conduit and a drain conduit to circulate the cooling water to and from a pressure vessel which surrounds a reactor core, the cooling water having a free liquid level maintained above the reactor core, the improvement characterized in that said drain conduit is inserted in the pressure vessel from the upper side toward the lower side relative to said free liquid level, a double tube consisting of an inner tube and an outer tube maintaining a gap therebetween is formed in the end portion of said drain conduit, said inner tube and outer tube being contiguous with said drain conduit, the opening at the lower end of the inner tube is located below said free liquid level but above said reactor core, the opening at the upper end of said outer tube is located above said free liquid level, and the opening at the lower end of said outer tube is located below the reactor core.

2. A nuclear reactor according to claim 1, wherein the lower end portion of the outer tube has the shape of a funnel which flares downwardly.

3. A nuclear reactor according to claim 1, wherein the lower end portion of the inner tube has the shape of a funnel which flares downwardly.

4. A nuclear reactor according to claim 1, wherein helical fins are provided in the outer tube at a position below the lower end of the inner tube.

5. A nuclear reactor according to claim 1, 2, 3 or 4, wherein the nuclear reactor is a boiling-water reactor, and the cooling water circulation system is of the type of recirculation to enhance the core efficiency.

6. A nuclear reactor according to claim 1, 2, 3 or 4, wherein the nuclear reactor is of the type of natural circulation, and the cooling water circulation system is of the type which purifies water.

7. A nuclear reactor according to claim 1, 2, 3 or 4, wherein the nuclear reactor is of the type of natural circulation, and the cooling water circulation system is of the spray type which controls pressure.

8. In a nuclear reactor equipped with a cooling water circulation system which includes a water-feed conduit means and a drain conduit means for circulating the cooling water to and from a pressure vessel which surrounds a reactor core, the cooling water having a free liquid level maintained above the reactor core, the improvement characterized in that said drain conduit means is inserted in the pressure vessel from the upper side toward the lower side relative to said free liquid level, said drain conduit means having an opening at a lower end thereof which is located below the reactor core, and at least one other opening at a position lower than said free liquid level and higher than the reactor core, said drain conduit means comprising a double tube including an inner tube and an outer tube maintaining a gap therebetween, said opening at the lower end of said drain conduit means located below the reactor core being provided by the opening at the lower end of said outer tube, and the at least one other opening at a position lower than said free liquid level and higher than the reactor core being provided by an opening at the lower end of said inner tube, said outer tube having an opening at the upper end thereof which is located above said free liquid level.

9. A nuclear reactor according to claim 8, wherein the lower end portion of said outer tube has the shape of a funnel which flares downwardly.

* * * * *